United States Patent [19]
Sakano

[11] Patent Number: 4,485,635
[45] Date of Patent: Dec. 4, 1984

[54] CONTROL DEVICE FOR A COMPRESSOR IN A REFRIGERATING SYSTEM

[75] Inventor: Riichi Sakano, Okabe, Japan

[73] Assignee: Sanden Corporation, Gunma, Japan

[21] Appl. No.: 451,941

[22] Filed: Dec. 21, 1982

[30] Foreign Application Priority Data

Dec. 21, 1981 [JP] Japan .................. 56-190759[U]

[51] Int. Cl.³ .................. F25B 1/00; B60H 3/04
[52] U.S. Cl. .................. 62/209; 62/227; 62/229; 62/228.5; 62/244
[58] Field of Search .................. 62/243, 244, 323.4, 62/229, 510, 228.5, 196.2, 227, 226, 208, 209, 158, 157; 165/41, 42, 43; 98/2.01, 2.11; 236/78 B, 80 C, 91 F

[56] References Cited

U.S. PATENT DOCUMENTS 2,319,130  5/1943  Hanson .................. 62/228.5 X
4,187,093  2/1980  Boratgis et al. .................. 62/229 X
4,189,093  2/1980  Schnaibel et al. .................. 236/37

FOREIGN PATENT DOCUMENTS 2075724  11/1981  United Kingdom .................. 62/158

Primary Examiner—Harry Tanner
Attorney, Agent, or Firm—Banner, Birch, McKie & Beckett

[57] ABSTRACT

A control device is disclosed for controlling the operation of a compressor in an air conditioning or refrigerating system. The compressor includes a variable displacement device which changes the capacity of the compressor and a magnetic clutch which operates the compressor in response to an external drive mechanism. The control device controls the operation of both the variable displacement device and the magnetic clutch in response to the temperature of the cool air generated at the evaporation of the air conditioning or refrigerating system. Two temperature detectors having different thermal response characteristics detect the temperature of the cool air. The difference between the temperatures detected by these sensors is used by the control device to control the operation of the variable displacement device.

10 Claims, 6 Drawing Figures

CONTROL DEVICE FOR A COMPRESSOR IN A REFRIGERATING SYSTEM

BACKGROUND OF THE INVENTION

This invention relates to a control system for controlling the operation of an air conditioning system, and more particularly, to a control circuit for a variable displacement compressor in an automobile air conditioning system.

In conventional air conditioners, thermal control in the room generally is accomplished by the intermittent operation of the air conditioning compressor through a magnetic clutch or motor. The magnetic clutch or motor is connected to the compressor and activated by a signal from a thermostat disposed in the room. Once the temperature in the room has been lowered to a desired temperature, the refrigerating or cooling capacity of the air conditioner for supplemental cooling because of further temperature changes in the room, or for keeping the room at the desired temperature, need not be as large. Therefore, after the room has been cooled to the desired temperature, conventional air conditioning compressors are intermittently operated in response to the thermostat signal. Compressors having a large cooling capacity are operated even more intermittently so that the large load required to drive such compressors is intermittently applied to the compressor drive mechanism.

In air conditioning systems for automobiles, the compressor usually is driven by the engine of the automobile. Since the r.p.m. of the automobile engine changes continuously, the rotation frequency of the compressor also changes which in turn rapidly changes the cooling capacity of the air conditioner. Automobile air conditioners generally are designed so that when the compressor is driven by the engine at normal driving speed, the air conditioner operates at optimum capacity. Therefore, when the compressor is driven by the engine at lower operating speed, or during idling, the cooling capacity of the air conditioner is insufficient in comparison with the refrigerating or cooling load. Also, when the compressor is driven by the engine at high operating speed, the cooling capacity is higher than necessary.

One known mechanism for controlling the excessive cooling capacity of an air conditioner operates by heating part of the cool air generated by the air conditioner. Part of the cool air from the evaporator of the air conditioner passes a heating unit which heats the cool air and this heated air is mixed with the remaining cool air to control the temperature of the air which is blown into the room or compartment. In this mechanism, the ratio of cooling capacity to heating capacity is controlled in response to driving frequency. This mechanism for controlling air temperature is complicated and considerable energy is spent to reheat the cool air by using engine power.

In another known embodiment, the magnetic clutch which is disposed on the compressor and connected between the engine and the compressor to transmit rotating motion is intermittently operated to control the operation of the compressor. However, since the magnetic clutch may be operated at high rotation frequency, a sudden force is generated at the moment the clutch is engaged and this sudden force is transmitted to the engine and the compressor. Also, the temperature of the air blown into the compartment drastically changes upon operation of the compressor.

SUMMARY OF THE INVENTION

It is a primary object of this invention to provide a control device for an air conditioning system, particularly an automobile air conditioner, which controls the refrigerating capacity of the air conditioner in response to operating conditions to maintain the correct balance between refrigerating capacity and refrigeration load at all times.

It is another object of this invention to provide a control device for an air conditioning system, particularly an automobile air conditioner, which reduces sudden forces acting on the engine and the compressor.

It is a further object of this invention to provide a control device for an air conditioning system, particularly an automobile air conditioner, which improves performance and efficiency.

The present invention is directed to a control device for a compressor in a refrigerating or air conditioning system. The compressor includes a variable displacement device which changes the capacity of the compressor and a magnetic clutch which operates the compressor in response to an external drive mechanism. The control device includes a magnetic clutch control circuit which controls the operation of the magnetic clutch and a capacity control circuit which controls the operation of the variable displacement device. The magnetic clutch control circuit and the capacity control circuit include thermistors mounted adjacent each other on the evaporator of the air conditioning system to detect the temperature of the cool air blown from the evaporator. The thermistor in the capacity control circuit has a higher thermal sensitivity, i.e., a different thermal response characteristic, than the thermistor in the magnetic clutch control circuit. By evaluating the differences between the temperatures detected by these thermistors, the compressor control device of the present invention adjusts the refrigerating or cooling capacity of the compressor in accordance with the cooling load to achieve optimum operation of the compressor.

Further objects, features and aspects of this invention will be understood from the following detailed description of the preferred embodiment of this invention referring to the annexed drawings.

DETAILED DESCRIPTION OF THE PREFERRED EMBODIMENT

Figure 1:
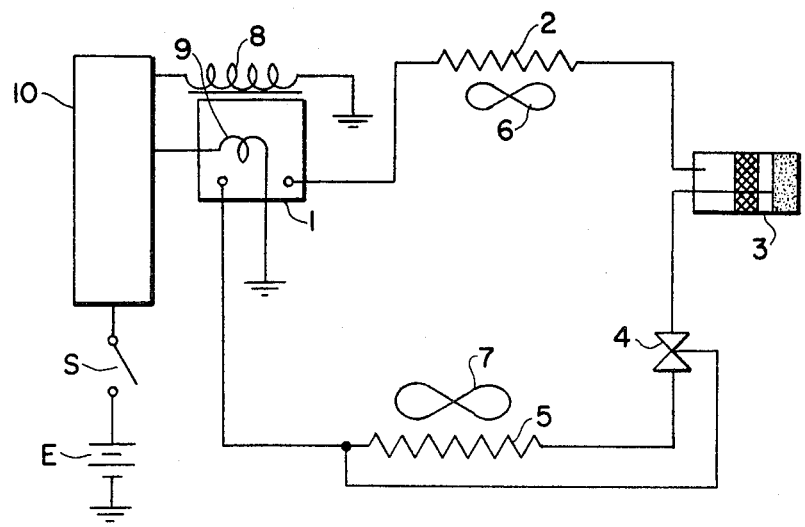
FIG. 1 is a schematic diagram of an air conditioning system including a refrigerant circuit and a control device constructed in accordance with this invention.

Referring to FIG. 1, the basic construction of an air conditioning system, particularly, an automobile air conditioning system, is shown. This air conditioning system comprises compressor 1, condenser 2, receiver and dryer 3, thermostatic expansion device or valve 4 and evaporator 5. These five basic components are coupled in series to form a conventional closed vapor cycle refrigeration circuit. Refrigerant gas is compressed in compressor 1 and supplied to condenser 2 where it is condensed to liquid refrigerant and cooled by forced ventilation of fan 6. The liquid refrigerant is accumulated in receiver and dryer 3, which removes the moisture and metal chips in the liquid refrigerant. The liquid refrigerant within receiver and dryer 3 is delivered to thermostatic expansion valve 4. The refrigerant expands as it flows through valve 4 and emerges as a two-phase mixture of liquid and gas, but primarily liquid. As the two-phase then flows through evaporator 5, which acts as a heat exchanger in conjunction with blower 7 which supplies air to the vehicle compartment by blower 7, heat is transferred from the incoming air to the refrigerant and the entirety of the refrigerant vaporizes and assumes its gaseous state. The refrigerant gas at the evaporator outlet then is passed to the suction inlet of compressor 1.

Compressor 1, which is shown in block diagram form in FIG. 1, is a variable displacement compressor. In the preferred embodiment, compressor 1 is a scroll type compressor including a variable displacement device as shown in copending patent application Ser. No. 356,648 filed on Mar. 9, 1982 and copending patent application Ser. No. 448,490 filed on Dec. 10, 1982. Compressor 1 is controlled by operation of magnetic clutch 8 and variable displacement device 9 which changes the refrigerating capacity thereof. Magnetic clutch 8 and variable displacement device 9 are controlled by operation of compressor control circuit 10, which is described in further detail below in connection with FIG. 3. Compressor control circuit 10 is connected to voltage source E by on/off switch S.

Figure 2:
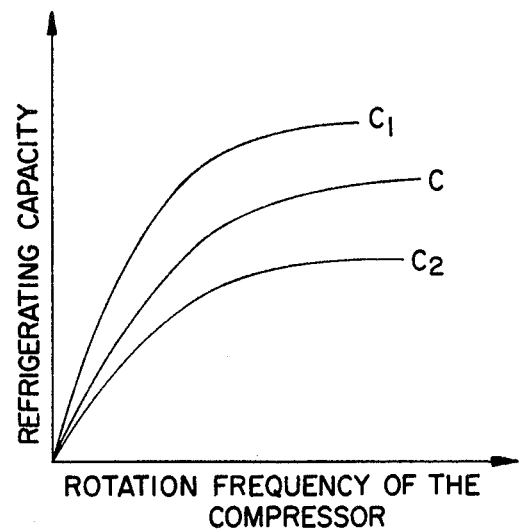
FIG. 2 is a characteristic diagram of the refrigerating or cooling capacity of a variable displacement compressor which is used in the refrigerant circuit of FIG. 1.

As mentioned above, compressor 1 includes a variable displacement device which is capable of changing the refrigerating or cooling capacity of the compressor. The capacity of the compressor shown in FIG. 1 can be changed to one of two conditions, $C_1$ or $C_2$, as shown in FIG. 2. In FIG. 2, curve C is the normal capacity of prior art compressors. The variable displacement device of compressor 1 includes at least one valve as shown in patent application Ser. Nos. 356,648 and 448,490 and this valve is controlled by solenoid 9 shown in FIG. 1. Solenoid 9 is connected to voltage source E through compressor control circuit 10 and main air conditioning on/off switch S.

Figure 3:
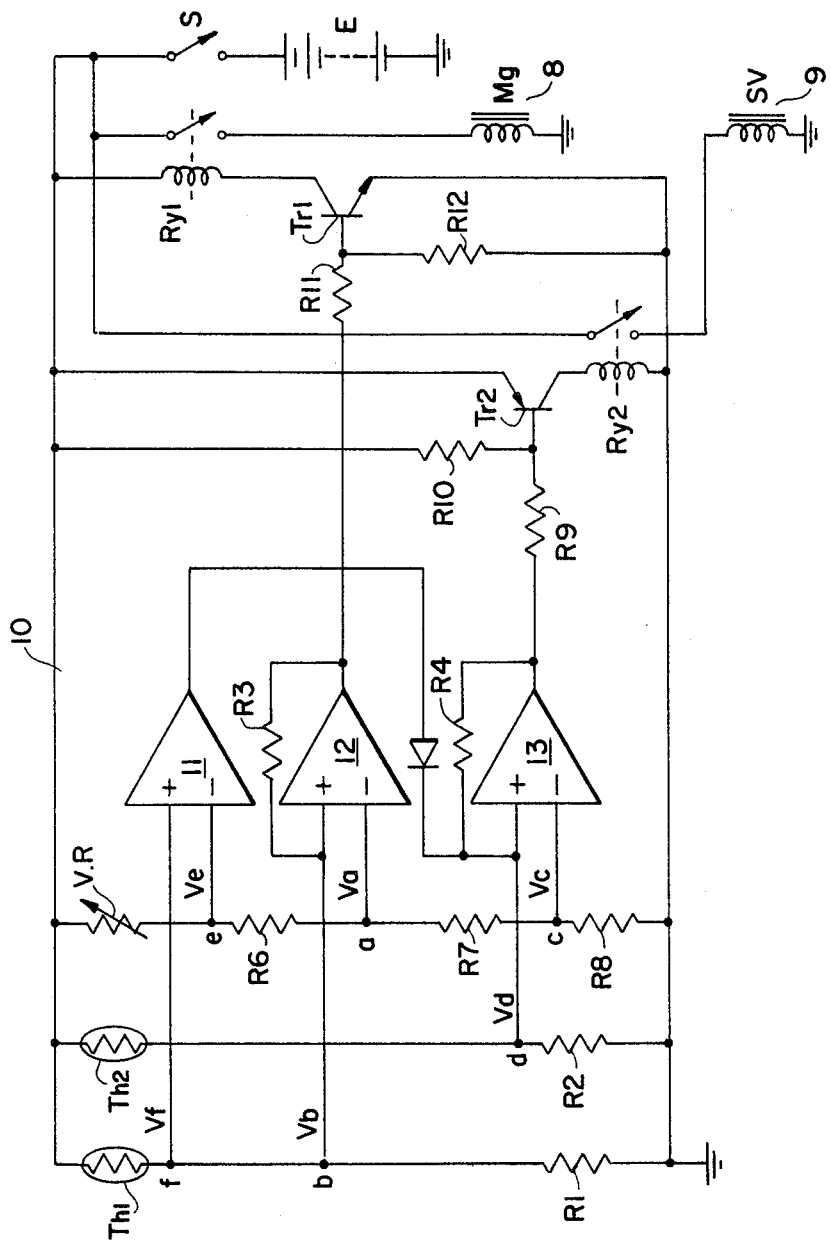
FIG. 3 is a circuit diagram of an embodiment of a control device for the compressor of FIG. 1.

Referring to FIG. 3, a circuit diagram of compressor control circuit 10 is shown. The compressor control circuit includes a magnetic clutch control circuit and a capacity control circuit. The magnetic clutch control circuit includes an input circuit formed by voltage comparator 12 and a voltage divider formed by thermistor $TH_1$ and resistor $R_1$. The voltage divider supplies voltage Vb to the non-inverting input terminal (+) of comparator 12. Thermistor $Th_1$ is mounted on the surface of the cool air outlet of evaporator 5 to detect the temperature of the cool air blown from evaporator 5.

The voltage Vb at point b of compressor control circuit 10 varies in accordance with the temperature of the cool air blown from evaporator 5 so that voltage signal Vb represents the temperature of the cool air at evaporator 5. This temperature voltage signal Vb is compared at comparator 12 with reference voltage Va which is generated by another voltage divider formed by variable resistance VR and resistors $R_6$, $R_7$ and $R_8$. Reference voltage Va which is applied to an inverting input terminal (−) of comparator 12, corresponds to predetermined temperature $T_2$. Reference voltage Va can be changed by varying the resistance of variable resistor VR, i.e., predetermined temperature $T_2$ can be changed by the user of the air conditioner.

The output of comparator 12 is coupled to the base of NPN switching transistor $Tr_1$ to control the operation of magnetic clutch 8. Transistor $Tr_1$ is biased by biasing resistors $R_{11}$ and $R_{12}$. The coil of relay $Ry_1$ is connected to the collector of transistor $Tr_1$ and the operating contact of relay $Ry_1$ is connected in series with coil Mg of electromagnetic clutch 8. When transistor $Tr_1$ is conductive, relay $Ry_1$ is energized so that electromagnetic coil Mg of clutch 8 is energized to operate compressor 1. Thus, the primary elements of the magnetic clutch control circuit are thermistor $Th_1$, comparator 12, switching transistor $Tr_1$, relay $Ry_1$ and magnetic clutch coil Mg.

The operation of the magnetic clutch control circuit when the temperature of the blown air is higher than predetermined temperature $T_2$ will now be described. In this condition, the voltage level of the output of comparator 12 is maintained high because temperature voltage signal Vb is higher than reference voltage Va. When the high voltage output of comparator 12 is applied to the base of NPN transistor $Tr_1$, transistor $Tr_1$ is rendered conductive and relay $Ry_1$ is energized which in turn operates the magnetic clutch. On the other hand, when the temperature of the blown air is lower than predetermined temperature $T_2$, the output of comparator 12 is low because reference voltage Va is higher than temperature voltage signal Vb. Transistor $Tr_2$ then is turned off which de-energizes the magnetic clutch.

Feedback resistor $R_3$ also is connected to comparator 12 so that the input-output response has a hysteresis effect. When temperature voltage signal Vb decreases from a level higher than reference voltage Va, the output of comparator 12 changes from a high level to a low level when temperature voltage signal Vb equals reference voltage Va. However, when temperature voltage signal Vb increases from a level equal to reference voltage Va, the output of comparator 12 does not immediately change from a low level to a high level, but at a time when the temperature voltage signal Vb is higher than reference voltage Va by a certain amount which is determined by the resistance of resistor $R_3$. Thus, the output response of comparator 12 to temperature has a hysteresis effect.

Figure 4:
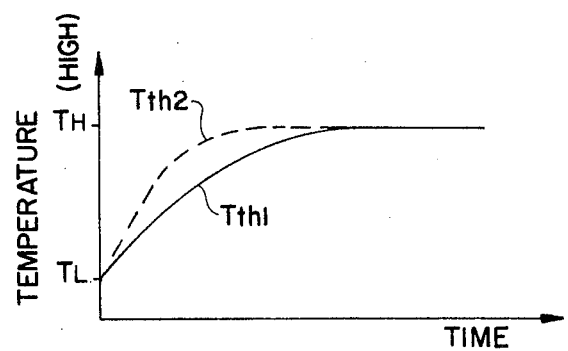
FIG. 4 is a diagram of the thermal response characteristics of two different thermistors used in the circuit of FIG. 3.

Compressor control circuit 10 also includes a capacity control circuit formed in part by thermistor $Th_2$. Thermistor $Th_2$ is mounted on the surface of the cool air outlet of evaporator 5 adjacent thermistor $Th_1$ to detect the temperature of the cool air blown from evaporator 5. Thermistor $Th_2$ has a different thermal response characteristic than thermistor $Th_1$ as shown by FIG. 4. The characteristic thermal responses of thermistors $Th_1$ and $Th_2$ are shown as curves $Tth_1$ and $Tth_2$, respectively. These curves indicate that voltage signals Vb and Vd are different and that thermistor $Th_2$ has a higher thermal sensitivity than thermistor $Th_1$.

A voltage divider is formed by thermistor $Th_2$ and resistor $R_2$ in order to supply a voltage signal Vd to a non-inverting input terminal (+) of comparator 13. The voltage signal Vd at point d varies in accordance with the temperature of the blown air from evaporator 5 so that voltage signal Vd represents the temperature of the blown or cool air. The temperature voltage signal Vd is compared at comparator 13 with reference voltage Vc which is generated by the voltage divider formed by variable resistance VR and resistors $R_6$, $R_7$ and $R_8$. Comparator 13 also includes a feedback resistor $R_4$ which corresponds to feedback resistor $R_3$ of comparator 12. Reference voltage Vc, which is applied to an inverting input terminal (−) of comparator 13, corresponds to predetermined temperature $T_3$.

The output of comparator 13 is coupled to the base of PNP switching transistor $Tr_2$ to control the operation of at least one valve in a variable displacement device in compressor 1 of FIG. 1. The coil of relay $Ry_2$ is connected to the collector of transistor $Tr_2$ and the operating contact of relay $Ry_2$ is connected in series with solenoid valve SV of variable displacement device 9. Transistor $Tr_2$ is biased by biasing resistors $R_9$ and $R_{10}$. When transistor $Tr_2$ is conductive, relay $Ry_2$ is energized so that solenoid valve SV is energized and to change the capacity of compressor 1 from large volume $C_1$ to small volume $C_2$. Thus, the primary elements of the capacity control circuit are thermistor $Th_2$, comparator 13, switching transistor $Tr_2$, relay $Ry_2$ and solenoid valve SV of variable displacement device 9.

The operation of the capacity control circuit when the temperature of the blown air is higher than the predetermined temperature $T_3$ will now be described. In this condition, the voltage level of the output of comparator 13 is maintained high because temperature voltage signal Vd is higher than reference voltage Vc. When the high voltage output is applied to the base of PNP transistor $Tr_2$, transistor $Tr_2$ does not conduct so that relay $R_2$ is not energized. On the other hand, when the temperature of the blown air is lower than predetermined temperature $T_3$, the output of comparator 13 changes to a low voltage level because reference voltage Vd is lower than temperature voltage signal Vc. Transistor $Tr_2$ then is rendered conductive to energize relay $Ry_2$ and solenoid valve SV to change the capacity of compressor 1 from large volume $C_1$ to small volume $C_2$. Once the output of comparator 13 is changed to a low voltage level, the temperature voltage signal Vd usually is lower than the reference voltage Vc until the output of comparator 11 changes to a high voltage level as further described below. Thus, solenoid valve SV continues to operate compressor 1 at small volume $C_2$.

The voltage Vf at point f of the circuit of FIG. 3, which corresponds to temperature voltage signal Vb, is applied to non-inverting input terminal (+) of comparator 11 and compared at comparator 11 with reference voltage Ve, which corresponds to predetermined temperature $T_1$. The output of comparator 11 is coupled via diode $D_1$ to the non-inverting input terminal (+) of comparator 13. Thus, if the output of comparator 11 changes to a high voltage level, the output of comparator 13 also changes to a high voltage level irrespective of the influence of temperature voltage signal Vd. The high voltage level output of comparator 13 changes the capacity of compressor 1 from small volume $C_2$ to large volume $C_1$.

Figure 5:
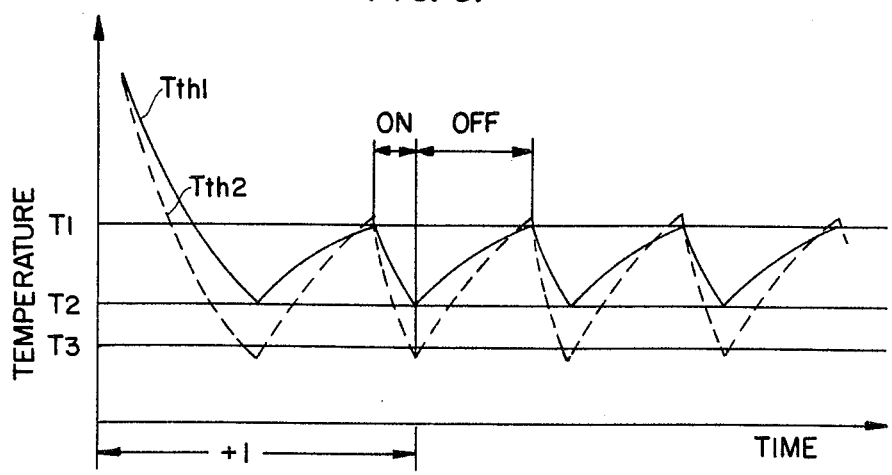
FIGS. 5 and 6 are graphs illustrating temperature changes in the cool air generated by the air conditioning system of the present invention as detected by the thermistors used in the circuit of FIG. 3.
Figure 6:
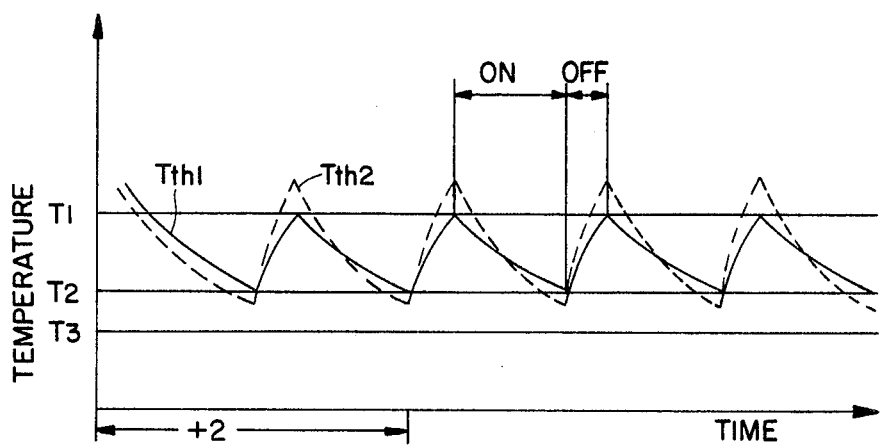

Referring now to FIGS. 5 and 6, the operation of the air conditioning system of this invention will be described. The changing temperature $Tth_1$ detected by thermistor $Th_1$ is shown by a solid line and the changing temperature $Tth_2$ detected by thermistor $Th_2$ is shown by a dotted line in FIGS. 5 and 6. Moreover, as shown in FIG. 4, the thermal response of thermistor $Th_2$ is more sensitive than thermistor $Th_1$.

When the air conditioning system is turned on by switch S and compressor 1 starts operating, air is cooled by evaporator 5 of the air conditioning system and blown into the compartment. When the temperature $Tth_1$ of blown air detected by thermistor $Th_1$ is gradually reduced below predetermined temperature $T_2$, the operation of compressor 1 is stopped by operation of the magnetic clutch control circuit as described above. After the operation of compressor 1 is stopped, the temperature of the blown air increases until it reaches predetermined temperature $T_1$, at which time, the compressor is again operated. Intermittent operation of compressor 1 continues as described above so that the temperature of blown air is kept in the temperature range $T_1$–$T_2$ as shown in FIGS. 5 and 6.

FIGS. 5 and 6 also illustrate the difference in thermal response of thermistors $Th_1$ and $Th_2$ as previously described in connection with FIG. 4. Thermistor $Th_2$ has a higher thermal sensitivity than thermistor $Th_1$ so that the rate of change in temperature $Tth_2$ detected by thermistor $Th_2$ is greater than the rate of change in temperature $Tth_1$ detected by thermistor $Th_1$. For example, as illustrated in FIG. 5, the on/off condition of the compressor is controlled by the compressor control circuit in response to the temperature $Tth_1$ detected by the less sensitive thermistor $Th_1$. Thus, while temperature $Tth_1$ does not go below predetermined temperature level $T_2$, the temperature $Tth_2$ detected by the more sensitive thermistor $Th_2$ does go below predetermined temperature level $T_2$, and can even reach predetermined temperature level $T_3$ which results in actuation of the variable displacement device by the capacity control circuit as described above.

For instance, if the refrigerating capacity of compressor 1 is larger than the refrigerator or cooling load of the air conditioner, a large difference occurs between the temperatures detected by $Th_1$ and $Th_2$ at time $t_1$ as shown in FIG. 5. In this condition, the operating time of the compressor is shorter than the non-operating time, i.e., the activity rate of the compressor is low. As a result, the temperature $Tth_2$ goes below predetermined temperature $T_3$, which causes the capacity control circuit to change the capacity of the compressor from large volume $C_1$ to small volume $C_2$ by operation of the variable displacement device.

On the other hand, if the refrigerating or cooling capacity of compressor 1 is almost the same as the refrigerator load of the air conditioner, a small difference exists between the temperatures detected by thermistors $Th_1$ and $Th_2$ at time $t_2$ as shown in FIG. 6. In this condition, the operating time of compressor 1 is longer than the non-operating time, i.e., the activity rate of the compressor is high. As a result, a large refrigerating capacity is not necessary so that the capacity of the compressor is not changed and the compressor is operated in its present condition. However, in this condition, if the temperature $Th_1$ detected by thermistor $Th_1$ exceeds the predetermined temperature $T_1$, the capacity of the compressor is changed from small volume $C_2$ to large volume $C_1$ as described above in connection with the operation of comparator 11 of the capacity control circuit.

This invention has been described in detail in connection with a preferred embodiment, but the preferred embodiment is an example only and this invention is not restricted thereto. It will be easily understood by those skilled in the art that other variations and modifications can be easily made within the scope of this invention.

I claim:

1. A control device for a refrigeration circuit including a compressor, a condenser, a thermostatic expansion device, an evaporator and a blower to blow cool air from said evaporator, said compressor having a magnetic clutch to drive said compressor and a variable displacement device to change the capacity of said compressor, said control device comprising:

a voltage source;

magnetic clutch control means connected to said voltage source for actuating said magnetic clutch to drive said compressor in response to the temperature of the cool air generated by said evaporator, said magnetic clutch having first temperature detecting means for detecting the temperature of the cool air;

capacity control means connected to said voltage source and said magnetic clutch control means for actuating said variable displacement device to change the capacity of said compressor in response to the temperature of the cool air generated by said evaporator, said capacity control means having a second temperature detecting means for detecting the temperature of the cool air, said second temperature detecting means having a different thermal response characteristic than said first temperature detecting means, said capacity control means evaluating the difference between the thermal responses of said first and second temperature detecting means to determine when to actuate said variable displacement device to change the capacity of said compressor.

2. The control device of claim 1 wherein said second temperature detecting means has a higher thermal sensitivity than said first temperature detecting means.

3. The control device of claim 2 wherein said first and second temperature detecting means are thermistors mounted adjacent each other on the surface of said evaporator.

4. The control device of claim 1 wherein said second temperature detecting means generates a voltage corresponding to the detected temperature and said capacity control means comprises a voltage comparator for comparing the voltage generated by said second temperature detecting means with a first predetermined voltage corresponding to a first predetermined temperature level and generating an output signal when the detected temperature is lower than the first predetermined temperature.

5. The control device of claim 4 wherein said capacity control means further comprises switching means responsive to the output signal from said comparing means for energizing said variable displacement device to reduce the capacity of said compressor when the temperature detected by said second temperature detecting means is lower than the first predetermined temperature level.

6. The control device of claim 4 wherein said first temperature detecting means has a lower thermal sensitivity than said second temperature detecting means and said first temperature detecting means generates a voltage corresponding to the detected temperature, said magnetic clutch control means comprising a voltage comparator for comparing the voltage generated by said first temperature detecting means with a second predetermined voltage level corresponding to a second predetermined temperature level higher than the first predetermined temperature level and generating an output signal when the temperature detected by said first temperature detecting means is higher than the second predetermined temperature level, said magnetic clutch control means further comprising a feedback resistor connected across said voltage comparator to provide a hysteresis effect which prevents the generation of an output signal by said voltage comparator until the temperature detected by said first temperature detecting means equals a third predetermined temperature level.

7. The control device of claim 6 wherein said magnetic clutch control means further comprises switching means responsive to the output signal of said voltage comparator of said magnetic clutch control means to intermittently energize said magnetic clutch to maintain the temperature detected by said first temperature detecting means between the second and third temperature levels.

8. The control device of claim 5 wherein said capacity control means further comprises a second voltage comparator having an input connected to said first temperature detecting means for comparing the temperature detected by said first temperature detecting means with a third predetermined voltage corresponding to a third predetermined temperature level, said second voltage comparator having an output connected to an input of the first voltage comparator of said capacity control circuit to enable said first voltage comparator to de-energize said variable displacement device to expand the capacity of said compressor if the temperature detected by said first temperature detecting means exceeds the third predetermined temperature level.

9. In an air conditioning system including a compressor, a condenser, a thermostatic expansion device, an evaporator and a blower to blow cool air from said evaporator into a designated space, said compressor having a magnetic clutch to drive said compressor and a variable displacement device to change the capacity of said compressor, a control device comprising:

a voltage source;

magnetic clutch control means connected to said voltage source for actuating said magnetic clutch to drive said compressor in response to the temperature of the cool air generated by said evaporator, said magnetic clutch control means having first temperature detecting means for detecting the temperature of the cool air;

capacity control means connected to said voltage source and said magnetic clutch control means for actuating said variable displacement device to change the capacity of said compressor in response to the temperature of the cool air generated by said evaporator, said capacity control means having a second temperature detecting means for detecting the temperature of the cool air, said second temperature detecting means having a different thermal response characteristic than said first temperature detecting means, said capacity control means evaluating the difference between the thermal responses of said first and second temperature detecting means to determine when to actuate said variable displacement device to change the capacity of said compressor.

10. A refrigerating system comprising:

a closed vapor cycle refrigeration circuit including a compressor, a condenser, a thermostatic expansion device, an evaporator and a blower to blow cool air from said evaporator into a designated space, said compressor having a magnetic clutch to drive said compressor and a variable displacement device to change the capacity of said compressor;

temperature detecting means coupled to said evaporator for detecting the temperature of the cool air generated by said evaporator, said temperature detecting means including first and second temperature sensors having different thermal response characteristics;

magnetic clutch circuit means for actuating said magnetic clutch to drive said compressor in response to the temperature detected by said first temperature sensor; and capacity control circuit means coupled to said variable displacement device for actuating said variable displacement device to change the capacity of said compressor in response to the differences in temperatures detected by said first and second temperature sensors.

* * * * *